United States Patent [19]
Whiteside

[11] Patent Number: 5,335,694
[45] Date of Patent: Aug. 9, 1994

[54] FLUSH VALVE FLOW CONTROL REFILL RING

[75] Inventor: John F. Whiteside, Franklin Park, Ill.

[73] Assignee: Sloan Valve Company, Franklin Park, Ill.

[21] Appl. No.: 65,778

[22] Filed: May 24, 1993

[51] Int. Cl.[5] .................. F16K 7/17; F16K 31/385
[52] U.S. Cl. .................. 137/625.37; 251/38; 251/40; 251/45
[58] Field of Search .............. 251/38, 40, 45, 44; 137/550, 544, 625.37

[56] References Cited

U.S. PATENT DOCUMENTS

| 3,904,168 | 9/1975 | Marocco | 251/45 X |
| 4,998,558 | 3/1991 | Solomon | 137/625.37 X |

FOREIGN PATENT DOCUMENTS

| 107682 | 11/1938 | Australia | 251/40 |

*Primary Examiner*—Arnold Rosenthal
*Attorney, Agent, or Firm*—Dorn, McEachran, Jambor & Keating

[57] ABSTRACT

A flush valve for use with toilet devices such as urinals and water closets includes a body having an inlet and an outlet. There is a valve seat between the inlet and outlet and a barrel connects the valve seat with the outlet. A diaphragm assembly is positioned within the flush valve and movable toward and away from a closing position on the valve seat to control the flow of water to the outlet. The diaphragm assembly includes a diaphragm peripherally clamped within the flush valve housing and a refill ring extending downstream from the diaphragm. The refill ring has a plurality of circumferentially disposed passages connecting the inlet and outlet when the diaphragm assembly is away from the valve seat. The size of the passages in the refill ring determines the volume of water flow during operation of the flush valve.

16 Claims, 3 Drawing Sheets

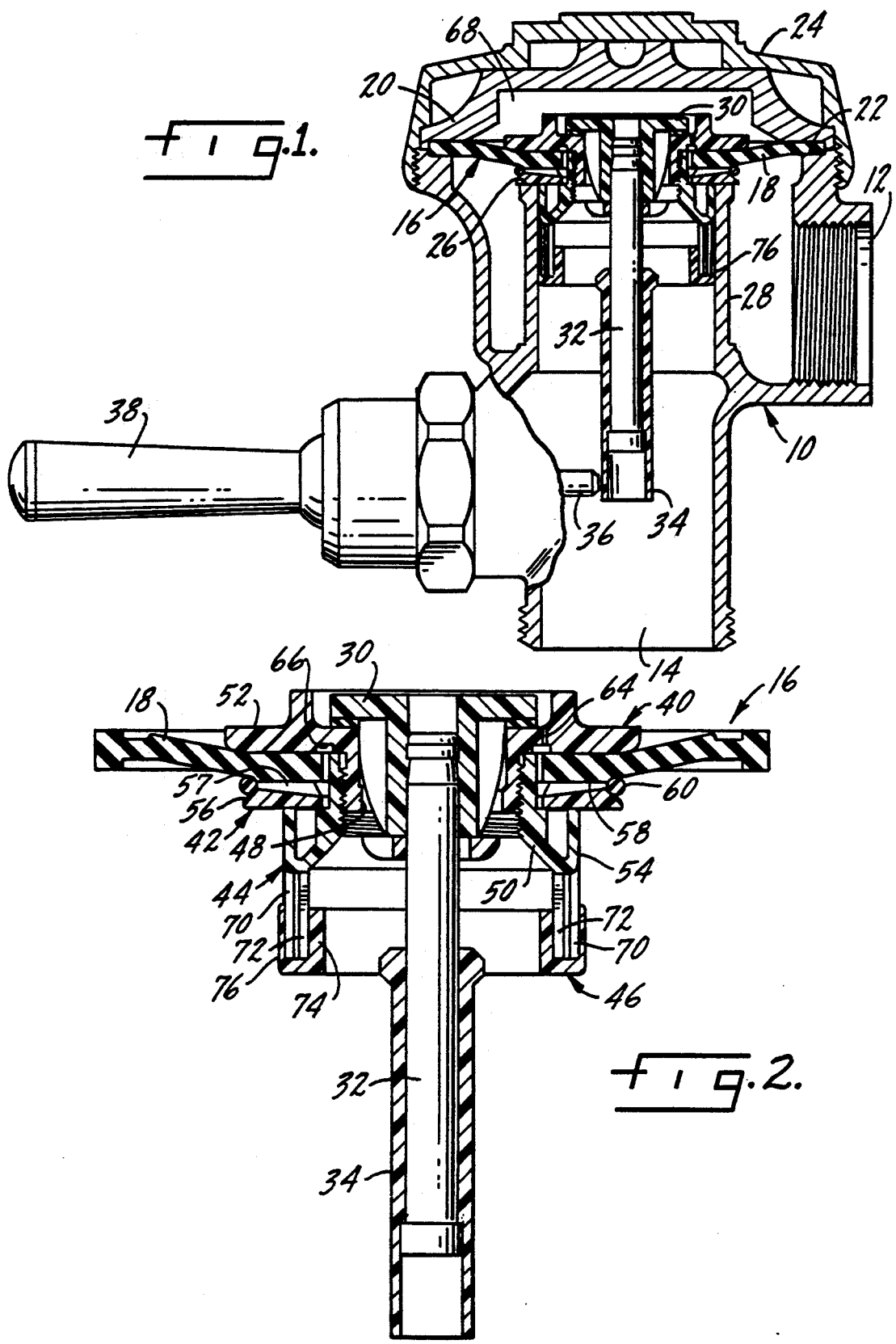

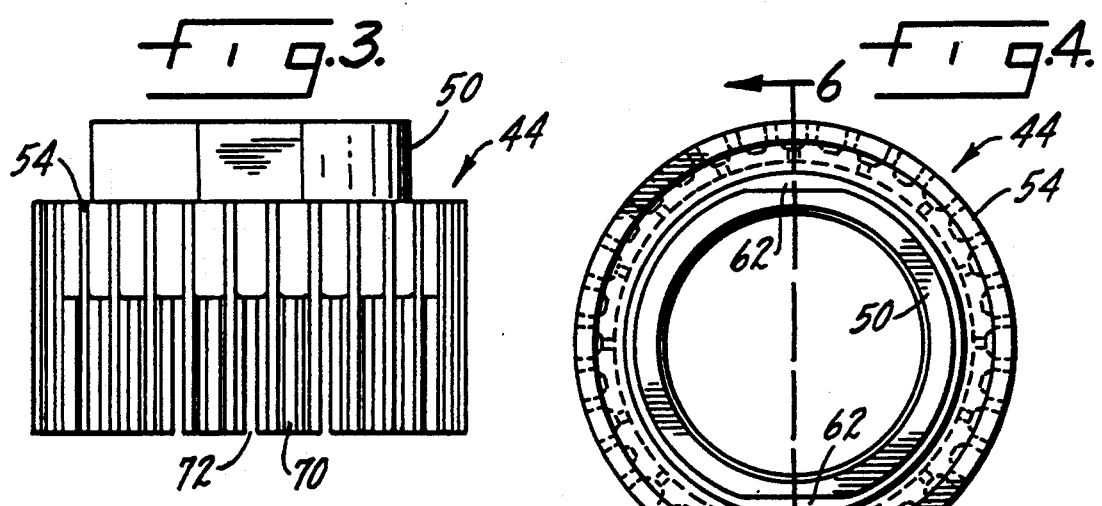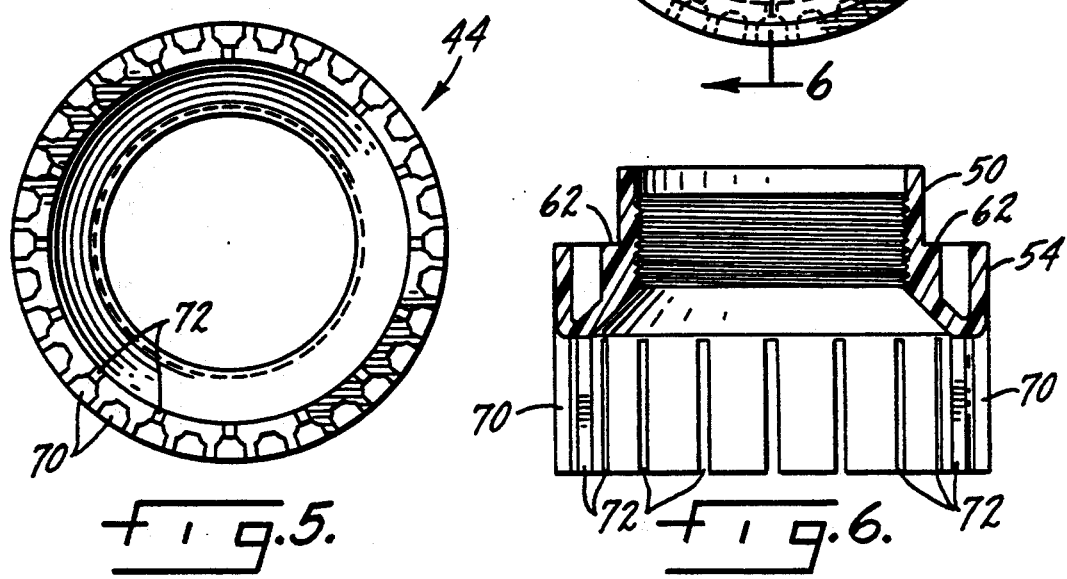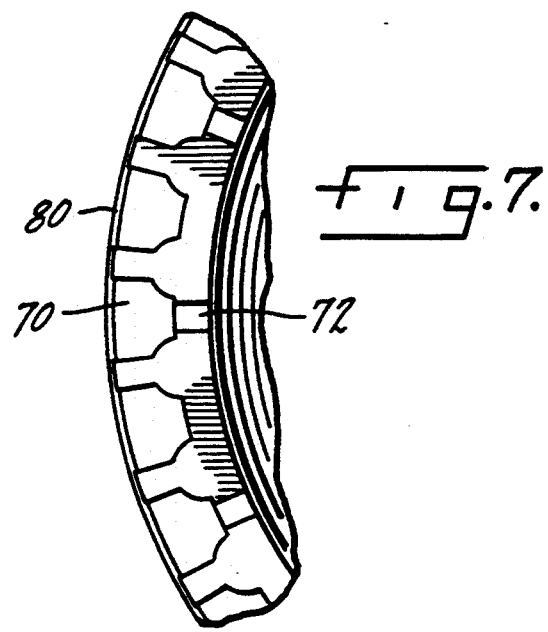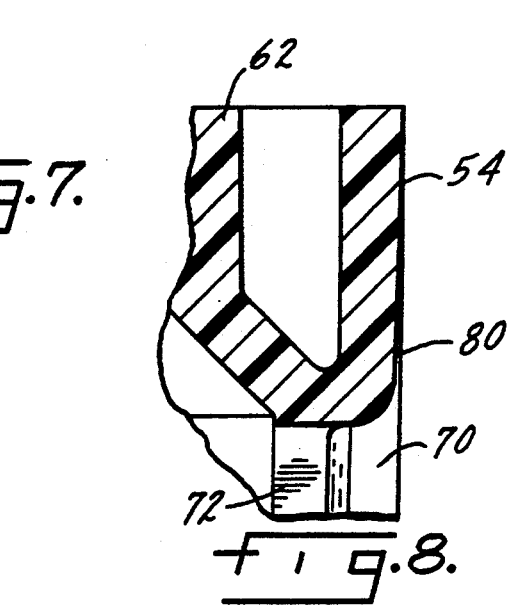

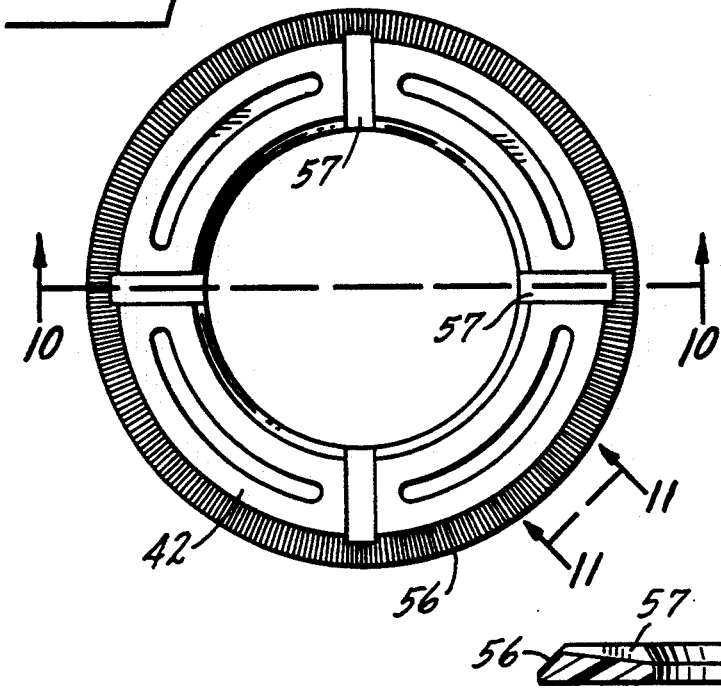
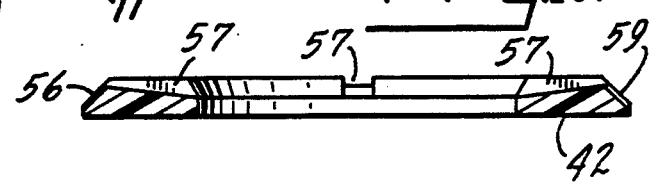
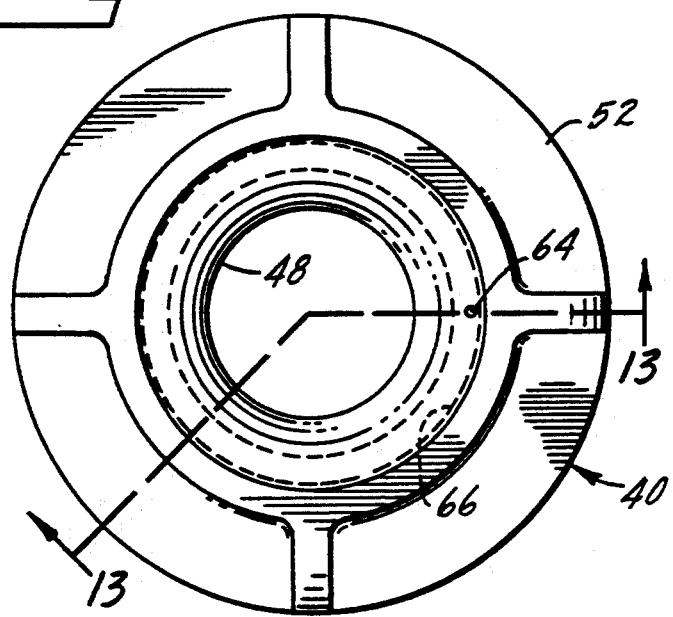
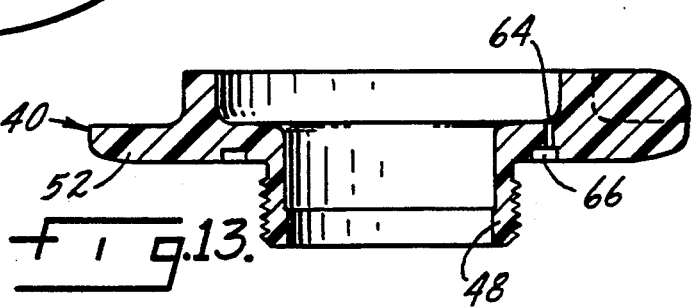

FLUSH VALVE FLOW CONTROL REFILL RING

THE FIELD OF THE INVENTION

The present invention relates to flush valves of the type used with toilet devices such as urinals and water closets and particularly to a diaphragm flush valve. More specifically, the invention relates to an improved flow control ring which determines the volume of water passing through the flush valve at each operation thereof. Increasingly, municipalities and other government bodies are regulating the use of water and particularly the use of water in toilet devices. The permitted volume of water flow per flush valve operation will vary from area to area and will vary depending upon the type of toilet device with which it is used. The present invention is specifically directed to a flow control ring which will accurately meter water flow during each operation of the flush valve and also includes simplified means for changing the volume of water flow to comply with the variant water flow codes in the United States.

SUMMARY OF THE INVENTION

The present invention relates to a toilet device flush valve an particularly to an improved refill ring for controlling the volume of water used during each operation of the flush valve.

A primary purpose of the invention is to provide a flow control ring for a flush valve, which ring accurately meters the amount of water flow.

Another purpose of the invention is to provide a flush valve as described in which the refill ring mounts a flow control ring, the proportions of which may be varied to accommodate varying municipal water codes.

Another purpose is a flow control ring for the use described, the shape of which is effective to control back pressure during a flushing operation so that the volume of water passed during each use of the flush valve is constant and independent of the water pressure applied to the flush valve.

Other purposes will appear in the ensuing specification, drawings and claims.

BRIEF DESCRIPTION OF THE DRAWINGS

The invention is illustrated diagrammatically in the following drawings wherein:

FIG. 1 is a side view, in part section, illustrating a flush valve of the type described;

FIG. 2 is an enlarged section illustrating the diaphragm assembly;

FIG. 3 is a side view of the refill ring;

FIG. 4 is a top view of the refill ring;

FIG. 5 is a bottom view of the refill ring;

FIG. 6 is a section along plane 6—6 of FIG. 4;

FIG. 7 is an enlarged partial section of the refill ring illustrating the water passages therethrough;

FIG. 8 is an enlarged partial section of the refill ring outer wall;

FIG. 9 is a top view of the filter disc;

FIG. 10 is a section along plane 10—10 of FIG. 9;

FIG. 11 is an enlarge section along plane 11—11 of FIG. 9;

FIG. 12 is a top view of the retaining disc; and

FIG. 13 is a section along plane 13—13 of FIG. 12.

DESCRIPTION OF THE PREFERRED EMBODIMENT

In the drawings, a flush valve of the type manufactured by the assignee of the present application, Sloan Valve Company, of Franklin Park, Ill., and sold under the trademark ROYAL, is shown to include a body 10 having an inlet connection 12 and an outlet connection 14. A diaphragm assembly, indicated generally at 16, includes a diaphragm 18 peripherally held to the body 10 by an inner cover 20. The diaphragm is seated upon a shoulder 22 at the upper end of body 10 and is clamped in this position by the inner cover 20. An outer cover 24 is screwthreaded onto the body to hold the inner cover in position.

The diaphragm assembly 16, as shown in FIG. 1, is closed upon a valve seat 26 formed at the upper end of a barrel 28. The barrel 28 forms the conduit connecting the valve seat with outlet 14. The diaphragm assembly 16 includes a relief valve 30 having a downwardly-extending stem 32 carrying a movable sleeve 34. Sleeve 34 is positioned for contact by a plunger 36 when operated by a handle 38 as is conventional in the operation of flush valves of the type disclosed.

Focusing specifically on the diaphragm assembly 16, in addition to the diaphragm 18 and the relief valve 30, this assembly includes a retaining disc 40, a filter disc 42, a refill ring 44, and a flow control ring 46. The retaining disc 40 has an inner cylindrical threaded portion 48 which is attached to a mating cylindrical threaded portion 50 on refill ring 44. The described threaded connection clamps diaphragm 18 between an upper portion 52 of the retaining disc and filter disc 42. The refill ring has an upwardly-extending cylindrical portion 54 which bears against the bottom of the filter disc whereby the combination of the refill ring and the retaining disc clamp the diaphragm and filter disc together, thus forming the diaphragm assembly 16.

The upper surface of filter disc 42 has a series of closely spaced circumferentially disposed small grooves 56, which for example may have a depth of 0.012 inch. The upper surface of the filter disc having grooves 56 faces a lower surface 58 on the diaphragm which forms the upper boundary for the passages formed by the grooves 56. The grooves function as filter passages and are sized to prevent particles carried by the water from passing through the filter and clogging the bypass orifice. An annular seal ring 60 is positioned at the entrance of grooves 56 and is held between the lower surface of the diaphragm and the outward slanted surface 59 of the filter disc. It is the combination of seal ring 60, diaphragm 18, and the passages 56 which form the filter which is positioned upstream of the bypass orifice and will be of a size to prevent particles in the water from clogging the bypass orifice. The circumferentially disposed grooves 56 provide a substantial flow area, but yet one with openings sized to prevent water impurities from clogging the bypass orifice. The filter grooves protect the bypass orifice to insure that it performs its intended function.

Water flowing through grooves 56 to reach the interior of the filter disc will reach the space between the refill ring and the interior of the diaphragm and specifically will flow to multiple flatted areas 62 formed on the exterior of the cylindrical portion 50 of the refill ring. The flatted areas 62 provide a waterway which connects the filter passages 56 and the radial grooves 57 with the bypass orifice 64 in the retaining disc. Bypass orifice 64 is in communication with an annular groove 66 in the retaining disc which faces the refill ring and is in communication with the flatted areas 62. Thus, water passes from the filter made up of the individual grooves 56 to the flatted areas on the projection 50 of the refill ring and then to annular groove 66 on the bottom of the retaining disc. Groove 66 connects with the bypass orifice 64 and it is through this series of passages that water reaches the pressure chamber 68 positioned between inner cover 20 and diaphragm assembly 16.

As is known in the art, flush valves of the type disclosed herein require pressure in chamber 68 in order to maintain the diaphragm closed upon its seat 26. Water at inlet 12 will flow through the described filter and bypass to reach chamber 68 and will maintain the diaphragm in the closed position shown.

The refill ring 44 includes a plurality of outwardly facing vertical grooves 70, a portion of which have a passage 72 which connects the grooves 70 with the inside of the refill ring. When the flush valve is operated, the only passage for water to reach the outlet is through passages 72 to grooves 70. The number and size of passages 72 will determine the volume of water which passes in any flushing operation.

Present-day governmental codes strictly control the volume of water which may be used in the operation of a toilet device such as a urinal and water closet and the requirements differ for each such device. Since the valve shown herein may be used on both urinals and water closets, and may be used in areas having different water restrictions, the refill ring passages 72 may be sized to comply with the specific requirements for the location where the valve is to be used. In this connection, it should be noted that the flow control ring 46 has an upwardly-extending annular projection 74 which extends along the inside surface of the refill ring and determines the extent of passages 72 which will be available for water flow. The passages 72 may extend the full length of the refill ring, but the flow control ring and specifically the height of portion 74, determine what portion of the those passages is available for water flow. A change in the size of the flow control ring can therefore change the volume of water which passes in a flushing operation.

The exterior of the refill ring 44 is sized to closely fit the interior of barrel 28. Although the refill ring will raise up with the diaphragm assembly when the flush valve is operated, as described hereinafter, there will always be circumferential contact between the exterior lip 76 of the flow control ring and the interior of the barrel which will cause all of the water to flow through passages 72.

In operation, pivotal movement of handle 38 causes plunger 36 to contact the sleeve 34 of the relief valve. The relief valve tilts, venting the pressure from chamber 68 down through the interior of the diaphragm. This permits the diaphragm to raise up from its seat, pulling the diaphragm assembly upward, connecting the inlet 12 to the outlet 14 through the described passages 72 in the refill ring. As soon as the valve has been operated, the bypass orifice immediately begins to recharge chamber 68. When the chamber has been sufficiently pressurized, the diaphragm assembly will move toward closing upon its seat 26. As it so moves it will throttle and then ultimately close off the flow of water between the inlet and the outlet. As particularly shown in FIG. 8, the exterior of the refill ring has a specifically contoured surface indicated at 80 such that the closure of the refill ring as it moves into the barrel will control the back pressure in the valve. Back pressure is necessary to control the rate of closure and to provide for a relatively quick closure of the valve. The number of gallons of water that will pass through the valve on a flush will be to a degree determined not only by the flow through the refill orifice, but also by the rate of closure of the valve as the refill ring moves into the barrel. The desired result is for the flow through the valve during a single operation to be independent of the water pressure applied at the inlet. This can be brought about by controlling the back pressure which is determined by the flow control angle which is the angle formed between the contoured surface 80 at the exterior of the refill ring and the axial surface of barrel 28.

Whereas the preferred form of the invention has been shown and described herein, it should be realized that there may be many modifications, substitutions and alterations thereto.

The embodiments of the invention in which an exclusive property or privilege is claimed are defined as follows:

1. A flush valve for use with toilet devices such as urinals and water closets, including a body having an inlet and an outlet, a valve seat between said inlet and outlet, a valve member movable toward and away from said valve seat to control the flow of water to said outlet, said valve member including a diaphragm, a refill ring attached to said diaphragm for controlling water flow between the flush valve inlet and outlet, said refill ring having a plurality of axially extending exterior grooves in communication with said inlet when the valve member is away from said valve seat, said refill ring having radially extending passages connecting a portion of said grooves with the interior of said refill ring, the interior of said refill ring being in communication with the flush valve outlet, said refill ring exterior grooves and radial passages providing communication between said inlet and said outlet when said valve member is away from said valve seat.

2. The flush valve of claim 1 further characterized in that said exterior grooves are generally uniformly spaced about said refill ring.

3. The flush valve of claim 1 further characterized in that said flush valve includes a barrel connecting said valve seat and body outlet, said refill ring having a portion thereof, downstream of said exterior grooves, in peripheral contact with said barrel as said valve member moves toward and away from said valve seat.

4. The flush valve of claim 1 further characterized by and including a flow control ring attached to the downstream end of said refill ring, said flow control ring having an outwardly extending portion in peripheral contact with said barrel as said diaphragm and refill ring move toward and away from said valve seat.

5. The flush valve of claim 4 further characterized in that said flow control ring has an axially extending portion which extends inwardly of said refill ring covering a portion of said passages.

6. The flush valve of claim 5 further characterized in that said flow control ring axially extending portion extends uniformly into said refill ring.

7. The flush valve of claim 1 further characterized in that the exterior of said refill ring adjacent said exterior grooves gradually diverges from said barrel to maintain a generally constant back pressure upstream of said valve member as it moves to a valve seat closing position.

8. The flush valve of claim 7 further characterized in that the greatest divergence of said refill ring exterior is at the portion thereof furthest from the refill ring portion in peripheral contact with said barrel.

9. A valve member assembly for use in a toilet device flush valve for closing upon a valve seat thereof, the valve seat being located intermediate the flush valve inlet and outlet, with the flush valve having a barrel connecting the valve seat and outlet, said valve member including a diaphragm, a refill ring attached to said diaphragm for controlling water flow between the flush valve inlet and outlet, said refill ring having a plurality of circumferentially disposed axially extending exterior grooves in communication with the flush valve inlet when the valve member is away from the flush valve seat, said refill ring having radially extending passages connecting a portion of said grooves with the interior of said refill ring, the interior of said refill ring being in communication with the flush valve outlet, said refill ring exterior grooves and radial passages providing communication between the flush valve inlet and outlet when the valve member is away from said valve seat.

10. The valve member of claim 9 further characterized in that said refill ring has a portion thereof, downstream of said passages, in peripheral contact with the barrel as the valve member moves toward and away from the valve seat.

11. The valve member of claim 9 further characterized by and including a flow control ring attached to the downstream end of the refill ring, said flow control ring having an outwardly extending portion in peripheral contact with the flush valve barrel.

12. The valve member of claim 11 further characterized in that said flow control ring has an axially extending portion which extends inwardly of said refill ring covering a portion of said passages.

13. The valve member of claim 12 further characterized in that said flow control ring axially extends uniformly into said refill ring.

14. The valve member of claim 9 further characterized in that the exterior of said refill ring gradually diverges from the barrel to maintain a generally constant back pressure upon the valve member as it moves to a valve seat closing position.

15. The valve member of claim 14 further characterized in that the greatest divergence of said refill ring exterior is at the portion thereof furthest from the portion thereof in peripheral contact with the barrel.

16. A valve member assembly for use in a toilet device flush valve for closing upon a valve seat thereof, the valve seat being located intermediate the flush valve inlet and outlet, with the flush valve having a barrel connecting the valve seat and outlet, said valve member including a diaphragm, a refill ring attached to said diaphragm for controlling water flow between the flush valve inlet and outlet, said refill ring having a plurality of circumferentially disposed passages connecting the inlet and the outlet when the valve member is away from the flush valve seat, with the size of the passages determining the volume of water flow during operation of the flush valve, and a flow control ring attached to the downstream end of the refill ring, said flow control ring having a portion thereof which extends inwardly of said refill ring and covering a portion of said refill ring passages.

* * * * *